United States Patent [19]

Schwander et al.

[11] Patent Number: 4,562,249
[45] Date of Patent: Dec. 31, 1985

[54] BIS(4-(((CHLORO SUBSTITUTED PHENYL)AZO)ANILINO METHYLENES

[75] Inventors: Hansrudolf Schwander, Riehen; Rudolf Hurter, Basel, both of Switzerland

[73] Assignee: Ciba-Geigy Corporation, Ardsley, N.Y.

[21] Appl. No.: 707,548

[22] Filed: Mar. 5, 1985

Related U.S. Application Data

[63] Continuation of Ser. No. 582,160, Feb. 27, 1984, abandoned, which is a continuation of Ser. No. 247,422, Mar. 25, 1981, abandoned.

[30] Foreign Application Priority Data

Mar. 31, 1980 [CH] Switzerland .......................... 2538/80

[51] Int. Cl.[4] ...................... C09B 33/02; C09B 33/06; C09B 33/12; C09B 33/16
[52] U.S. Cl. .................... 534/641; 534/619; 534/642; 534/643; 534/728; 534/758; 534/759; 534/760; 534/764; 534/784; 534/822; 534/823; 534/824; 534/825; 534/831; 260/505 R; 260/510; 546/152; 564/372; 564/404
[58] Field of Search ............... 534/641, 642, 643, 619, 534/831, 784, 822, 728, 823, 824, 825, 756, 760, 758, 764

[56] References Cited

U.S. PATENT DOCUMENTS 3,912,712 10/1975 Peter et al. ...................... 534/831 X

FOREIGN PATENT DOCUMENTS 1238364 7/1971 United Kingdom ........... 534/831 X

Primary Examiner—Floyd D. Higel
Attorney, Agent, or Firm—Edward McC. Roberts; Kevin T. Mansfield; Irving M. Fishman

[57] ABSTRACT

There are described novel yellow to red azo compounds of the formula I

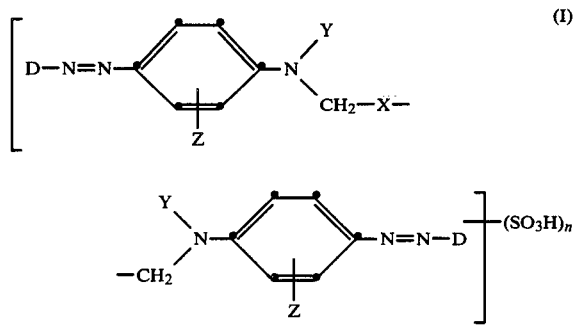

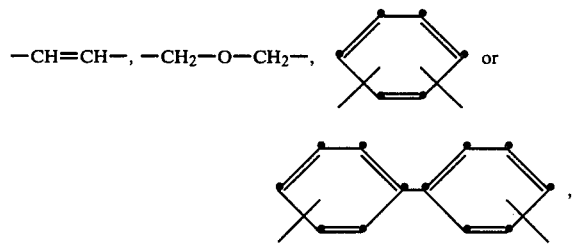

wherein each D independently of the other is the radical of an aromatic or heterocyclic diazo component, each Z independently of the other is hydrogen or a $C_1$–$C_4$-alkyl group or an acylamino group, Y is hydrogen or an unsubstituted or substituted $C_1$–$C_6$-alkyl group, X is either the direct bond or $C_1$–$C_6$-alkylene, $-CH=CH-$, $-CH_2-O-CH_2-$, [ring structures] or and n is a number from 2 to 6, preferably 2; and the substituent Y, in the case of an unsubstituted or substituted $C_1$–$C_6$-alkyl group, can also be bonded to the o-position relative to the N atom of the phenylene group to form a six-membered ring, or both Y substituents can be linked together to form a $C_1$–$C_6$-alkylene bridge; described also are processes for producing the novel compounds, and their use as dyes for dyeing and printing natural and synthetic textile materials, particularly polyamide and wool materials, and also cotton, whereby there are obtained dyeings which are distinguished by good general fastness properties, especially by a good dye build-up, very good fastness to wet processing, good fastness to light, and good resistance to formaldehyde and good stability to hydrolysis.

13 Claims, No Drawings

BIS(4-((CHLORO SUBSTITUTED PHENYL)AZO)ANILINO METHYLENES

This application is a continuation of Ser. No. 582,160, filed Feb. 27, 1984, now abandoned, which is a continuation of Ser. No. 247,422, filed Mar. 25, 1981, now abandoned.

The invention relates to novel azo compounds, to processes for producing them, and to their use as dyes for dyeing and printing natural and synthetic textile materials, particularly polyamide and wool materials.

The novel azo compounds correspond to the formula I

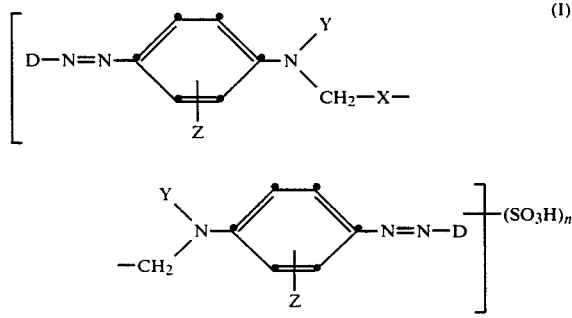

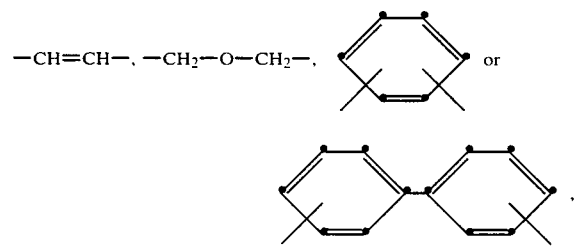

wherein each D independently of the other is the radical of an aromatic or heterocyclic diazo component, each Z independently of the other is hydrogen or a $C_1$-$C_4$-alkyl group or an acylamino group, Y is hydrogen or an unsubstituted or substituted $C_1$-$C_6$-alkyl group, X is either the direct bond or $C_1$-$C_6$-alkylene,

—CH=CH—, —CH$_2$—O—CH$_2$—, or and n is a number from 2 to 6, preferably 2; and the substituent Y, in the case of an unsubstituted or substituted $C_1$-$C_6$-alkyl group, can be bonded to the o-position relative to the N atom of the phenylene group to form a six-membered ring, or both Y substituents can be linked together to form a $C_1$-$C_6$-alkylene bridge.

As a radical of an aromatic or heterocyclic diazo component, D is for example a phenyl or naphthyl radical, or a radical of the thiazole, thiophene, imidazole, pyridine, indazole, pyrazole, triazole, brenzotriazole, thiadiazole, isothiazole, benzothiazole and phthalic acid imide series. These radicals can be identically or differently mono- or polysubstituted. Substituents are for example: CN; straight-chain or branched-chain $C_1$-$C_4$-alkyl and $C_1$-$C_4$-alkoxy groups; halogen, such as fluorine, chlorine or bromine; the $CF_3$ group; the $SO_2$-alkyl group, such as the methylsulfonyl, ethylsulfonyl, n- and iso-propylsulfonyl and n-, sec- and tert-butylsulfonyl groups; the $SO_2$-aryl group, such as the phenylsulfonyl group or naphthylsulfonyl group, which groups can be further substituted in the phenyl or naphthyl radical, for example by alkyl, especially methyl; the $SO_2NH_2$ group; the $SO_2$N-alkyl-N-cyclohexyl group, wherein the alkyl group has 1 to 4 carbon atoms, for example the $SO_2$N-methyl-N-cyclohexyl group or the $SO_2$-N-propyl-N-cyclohexyl group, the $SO_2$N(alkyl)$_2$ group, wherein the alkyl groups can have 1 to 4 carbon atoms, can be straight-chain or branched-chain and unsubstituted or substituted, for example the diethylaminosulfonyl group or the N-methyl-N-ethyl-aminosulfonyl group; it can also be the $SO_2$NH—R group, wherein R is an alkyl group having 1 to 8 carbon atoms which is unsubstituted or substituted, for example by phenyl, for example it is the monoethylaminosulfonyl group, n- and iso-monobutylaminosulfonyl group, monooctylaminosulfonyl group and benzylaminosulfonyl group; R can also be an aryl group, such as the phenyl or naphthyl group, or the cyclohexyl group or the group alkyl-($C_1$-$C_4$)—O—$SO_3H$. Further substituents in the radical D can be: the unsubstituted phenyl group or a phenyl group substituted by alkyl-($C_1$-$C_4$), particularly $CH_3$, or the group alkyl ($C_1$-$C_4$-)—O—$SO_3H$; finally, the radical D can be substituted also by a fibre-reactive group, especially by an acyl group of a carboxylic acid, which contains at least one halogen atom which can be split off under dyeing conditions; the groups concerned are for example chloroacetylamino groups or $\alpha,\beta$-dibromopropionylamino groups or $\alpha,\beta$-dichloropropionylamino groups.

Besides being able to be substituted by these stated substituents, the aromatic and heterocyclic radicals D can also be substituted by $SO_3H$ groups, these groups either being bonded directly on the aromatic or heterocyclic ring or being located on one of the substituents.

In preferred azo compounds of the formula I, D is the radical of an aromatic diazo component, particularly a phenyl group, which is mono- or polysubstituted by halogen, especially by chlorine, and optionally by $SO_3H$.

As a $C_1$-$C_4$-alkyl group, Z is a straight-chain or branched-chain alkyl group, for example the methyl, ethyl, n-propyl, iso-propyl, n-, sec- or tert-butyl group; as an acylamino group, Z is in particular the acetylamino group. In preferred azo compounds, Z is the $CH_3$ radical.

The bridge member X can be the direct bond, which at the same time is the preferred meaning; or, as a $C_1$-$C_6$-alkylene bridge, it is one which can be either straight-chain or branched-chain.

When the symbol Y denotes an unsubstituted $C_1$-$C_6$-alkyl group, this can be straight-chain or branched-chain; examples of such Y groups are: the methyl, ethyl, n-propyl, iso-propyl, n-butyl, sec-butyl or tert-butyl group, as well as the n- and iso-pentyl group and n- and iso-hexyl group. Apart from being substituted by the $SO_3H$ group, all these alkyl groups Y can be further substituted for example by an OH, CN, —$OSO_3H$ or phenyl group. In preferred azo compounds of the formula I, Y is an unsubstituted alkyl group, especially the $C_2H_5$ group.

The azo compounds of the formula I can be of symmetrical nature (preferred), that is to say, the two symbols D and Z are each identical or are of asymmetrical nature. If they are asymmetrical compounds, it is possible for example for the two diazo components D and/or the two substituents Z to be of a different nature, for example in such a manner that the two radicals D are identical and one Z is hydrogen and the other Z methyl.

A particularly valuable azo compound, especially on account of its good fastness to wet processing and to light on polyamide materials, corresponds to the formula

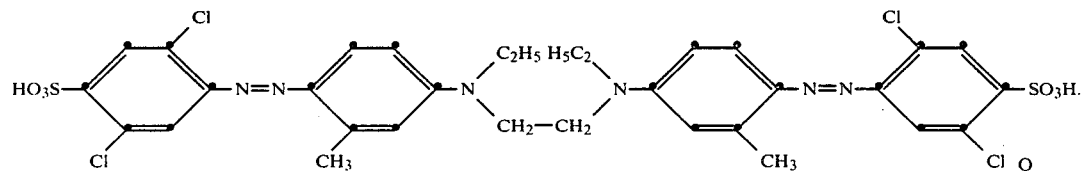

Mention may also be made of the azo compounds of the following formulae, which likewise yield dyeings having good wet fastness properties on polyamide materials:

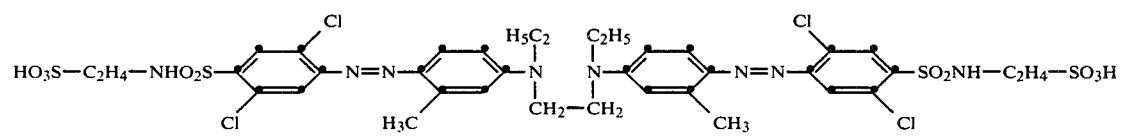

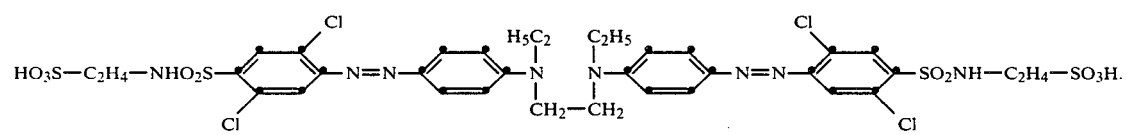

The azo compounds of the formula I are yellow to red compounds which can be produced for example by coupling 2 mols of a diazo component of the formula II D—NH₂ with 1 mol of a coupling component of the formula III

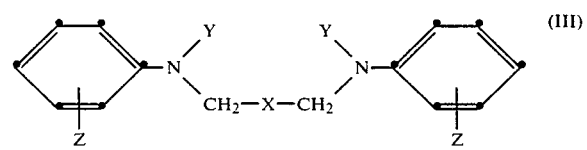

in which formulae II and III, the symbols D, Z, Y and X have the meanings defined under the formula I, the procedure being such that starting compounds II and III are used which yield azo compounds of the formula I containing 2 to 6 SO₃H groups, and/or that starting compounds II and III are used which have no SO₃H groups, in which case the coupling product is sulfonated after the coupling reaction.

The diazo components of the formula II are known: they are for example the following compounds:

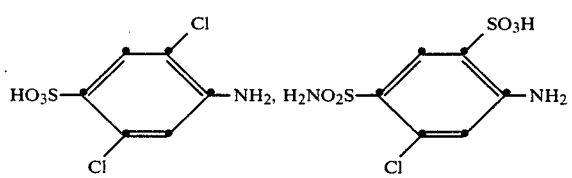

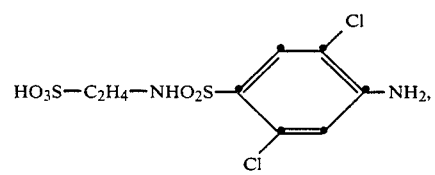

-continued

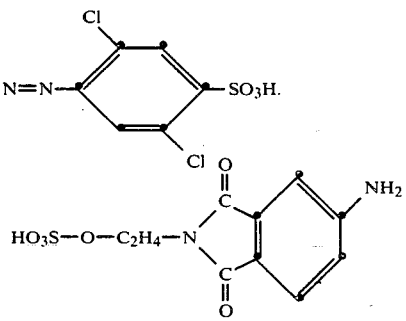

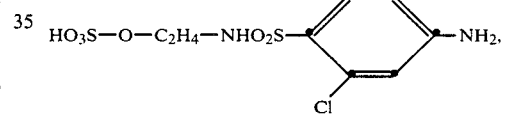

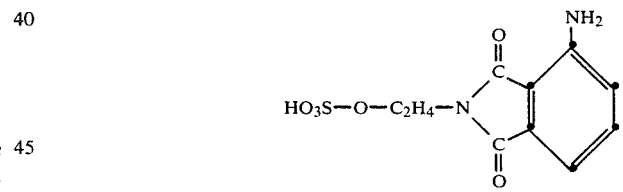

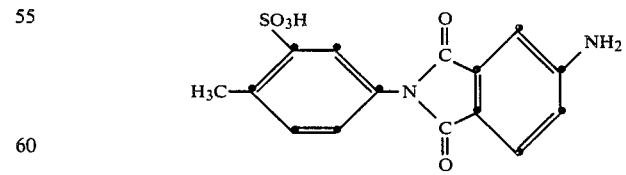

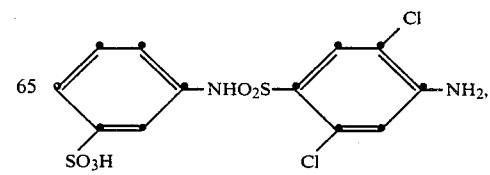

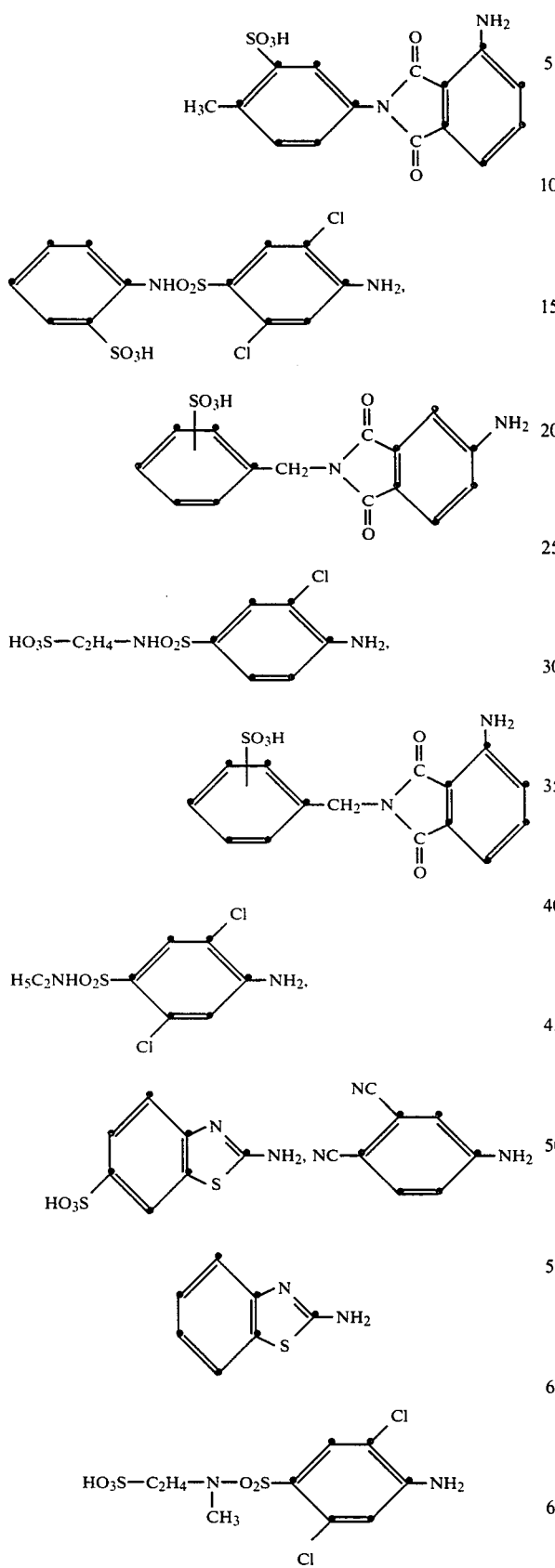

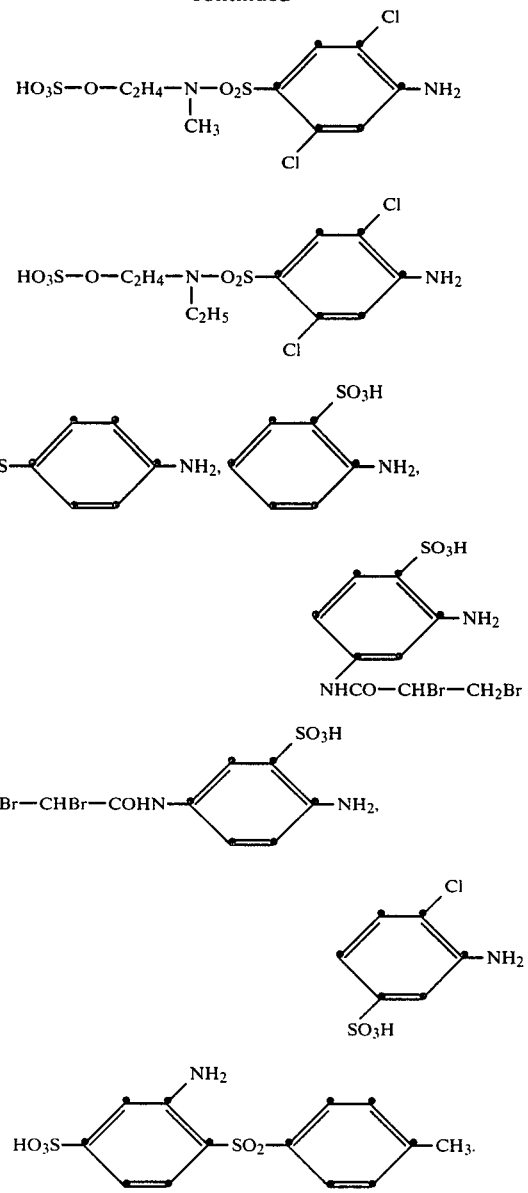

There are preferably used those diazo components D which are derived from an aromatic diazo component, particularly from a phenyl group which is mono- or polysubstituted by halogen, and optionally by $SO_3H$.

The coupling components of the formula III, both those with and those without an $SO_3H$ group, are for the most part novel. The following are given as examples of coupling components of this type:

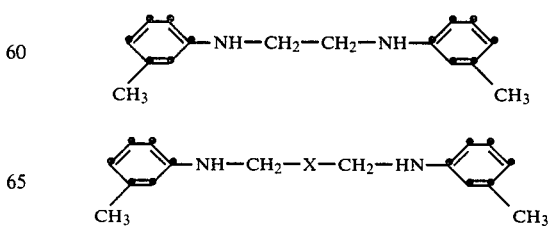

[X = —CH$_2$—

-continued
—CH₂—CH₂—
—[—CH₂—]₄—
—CH₂—CH—CH₂—
        |
        CH₃
—CH=CH—
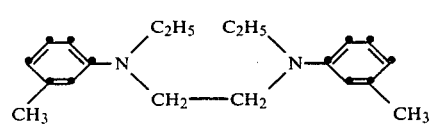
—CH₂—O—CH₂—]
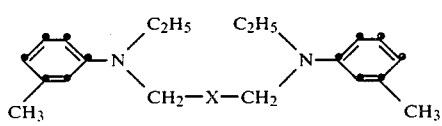
$\left[ X = -CH_2- \right.$
—CH₂—CH₂—
—(CH₂)₄—
—CH₂—CH—CH₂—
        |
        CH₃
—CH=CH—
—CH₂—O—CH₂—
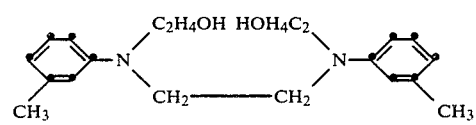
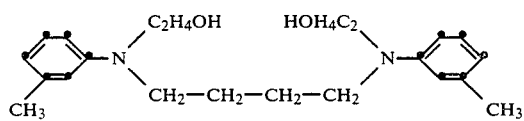
-continued
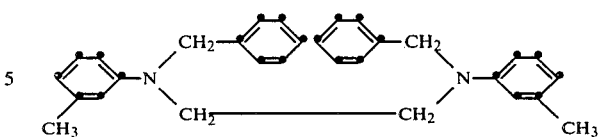
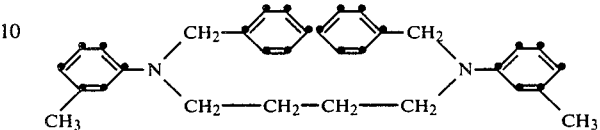
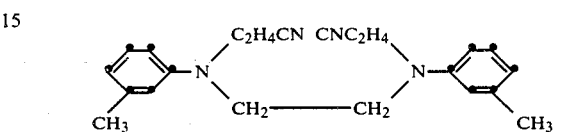
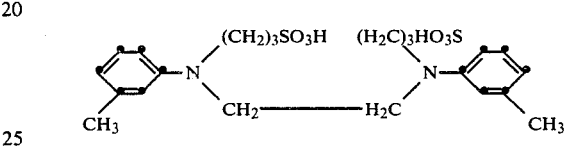
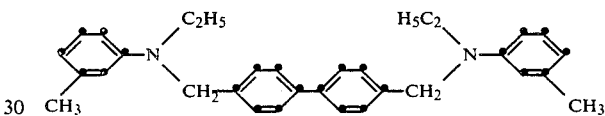
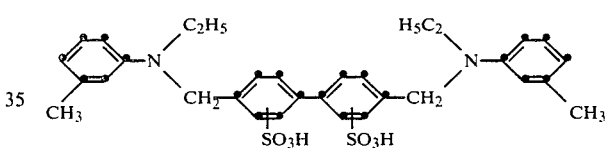
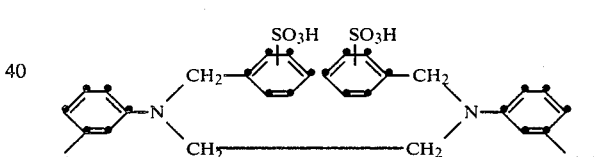
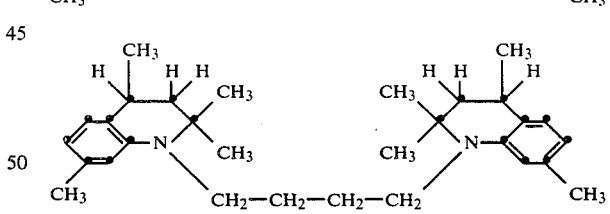
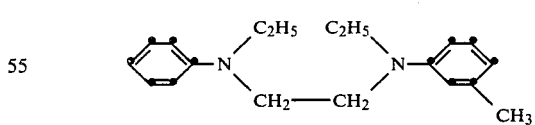
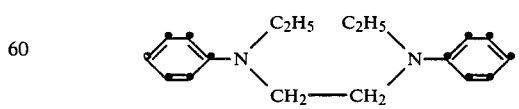
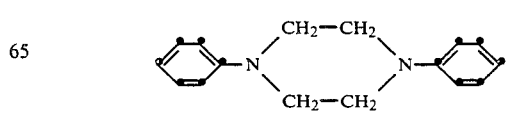

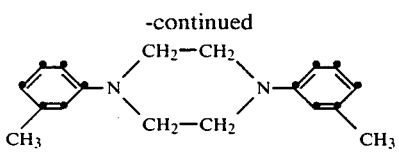

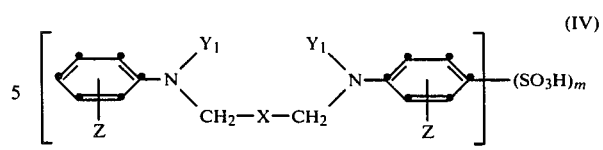

Coupling components of the formula III preferably used are those wherein Z is a $C_1$–$C_4$-alkyl group, especially the $CH_3$ group, X is the direct bond, and Y an unsubstituted $C_1$–$C_6$-alkyl group, particularly the $C_2H_5$ group.

The compounds of the formula III can be obtained by various process variants, for example by condensing in a known manner 2 mols of an amine of the formula

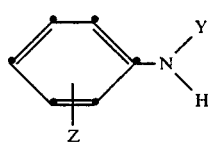

with one mol of a dihalogen compound of the formula $$Hal—CH_2—X—CH_2—Hal$$

wherein Z, Y and X have the meanings defined under the formula I, and "Hal" is a halogen atom.

Another possibility for producing in particular compounds of the formula III wherein Y is unsubstituted or substituted alkyl is to alkylate or condense, in a known manner, a compound of the formula

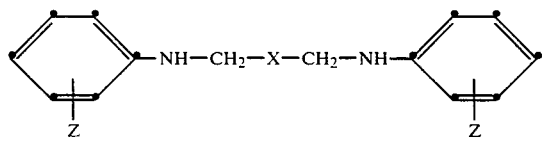

with a compound introducing the group Y.

When the compounds of the formula III are asymmetrical compounds on the basis of the substituents Z, these compounds can be produced for example by condensing a mixture of amines of the formulae

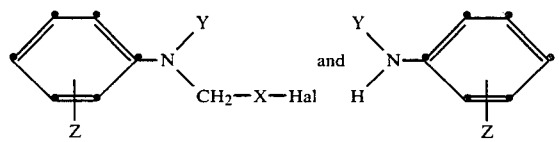

wherein Z, Y and X have the meanings defined under the formula I, and "Hal" is a halogen atom.

In the case where in the formula III the two Y substituents are linked together to form an alkylene bridge, the compounds in question can be produced by the procedure described in J. Amer. Chem. Soc., 40, 1429 (1918).

The compounds of the formula III obtained in the described manner can be sulfonated for example by means of oleum or chlorosulfonic acid.

The coupling reaction of the compound II with the compound III is performed in a known manner.

The invention hence relates also to the novel intermediates of the formula IV wherein each Z independently of the other is hydrogen or a $C_1$–$C_4$-alkyl group or an acylamino group, $Y_1$ is hydrogen or an unsubstituted or substituted $C_1$–$C_6$-alkyl group, X is either the direct bond or $C_1$–$C_6$-alkylene,

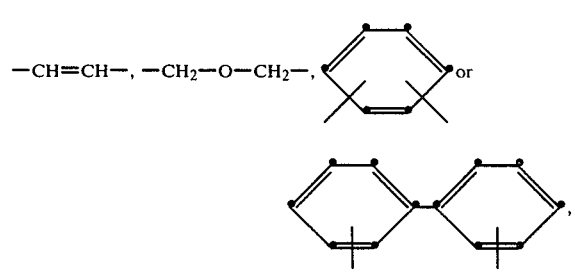

m is a number from 0–2, and the substituent $Y_1$, in the case of an unsubstituted or substituted $C_1$–$C_6$-alkyl group, can also be bonded to the o-position relative to the N atom of the phenyl group to form a six-membered ring.

The novel intermediates of the formula IV are used as coupling components for producing in particular azo compounds of the formula I, which for their part can be applied as dyes for dyeing and printing textile materials dyeable with anionic dyes, especially polyamide materials and wool, but also cellulose materials, such as cotton. Dyeing can be performed by any continuous or discontinuous methods suitable for the substrate concerned (for example exhaust, padding or printing processes). There are obtained with the azo dyes according to the invention dyeings which have good general fastness properties, particularly on polyamide and wool materials, such as above all a good dye build-up, very good wet fastness properties (fastness to perspiration, to washing and to hot water), good fastness to light, good resistance to formaldehyde and good stability to hydrolysis; finally, the novel azo dyes have a high degree of exhaustion, independently of the addition of auxiliaries.

The textile materials can be in the most varied stages of processing: they can be in the form of knitted goods, fabrics, yarns and fibres, as well as in the form of finished articles, such as shirts.

Unless otherwise stated in the following Examples, which serve to further illustrate the invention, 'parts' are parts by weight, percentages are percent by weight, and the temperatures are given in degrees Centigrade. The cationic dyes can be either in the free acid form —$SO_3H$ or in the form of their salts —$SO_3^{\ominus}M^{\oplus}$, wherein M is for example an alkali metal, lithium, sodium, potassium, ammonium, mono-, di- and tri($C_2$–$C_3$-alkanolammonium or mono-, di-, tri- or tetra-($C_1$–$C_4$-alkyl)-ammonium.

EXAMPLE 1

A mixture consisting of 321 g of m-toluidine, 94 g of 1,2-dibromoethane and 40 g of magnesium oxide is stirred for 12 hours at a temperature of 100°–102°, and then for 2 hours at 123°-125°, whereupon 300 ml of isopropanol and 10 g of a filtering auxiliary (diatomaceous earth) are added, and the mixture is clarified through a suction filter. The filter residue is subsequently washed with 200 ml of hot isopropanol; the filtrates are combined, and the isopropanol and the excess of m-toluidine are afterwards removed in vacuo to leave as residue the product of the formula

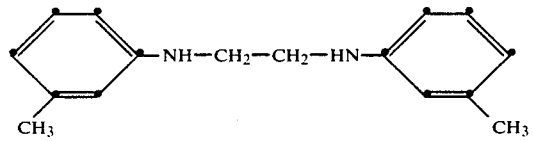

in the form of viscous oil.

By using, in place of dibromoethane, the dihalogen compounds listed in column I of the following Table 1, with otherwise the same procedure, there are obtained the products shown in column II.

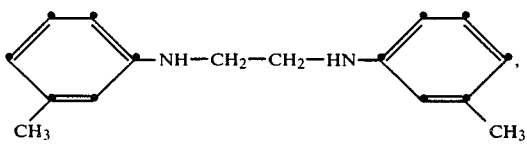

170 g of diethyl sulfate, 44 g of magnesium oxide and 500 ml of ethylene glycol monoethyl ether is stirred for 6 hours at a temperature of 100°, whereupon 10 g of a filtering auxiliary are added and the mixture is clarified through a suction filter. The filter residue is washed with a total amount of 100 ml of hot ethylene glycol monoethyl ether, and the solvent is then removed in vacuo from the combined filtrates. The residue is taken up in 400 ml of toluene, and extraction is performed by shaking in a separating funnel three times with 80 ml of 0.5N sodium hydroxide solution each time, the resulting product being then washed neutral with water. The organic phase is dried over magnesium sulfate, the tolu-

TABLE 1

|     | I | II |
|-----|---|----|
| No. | Dihalogen compound | X |
| 2 | Br—CH$_2$—CH$_2$—CH$_2$—Br | —CH$_2$— |
| 3 | Br—CH$_2$—CH$_2$—CH$_2$—CH$_2$—Br | —CH$_2$—CH$_2$— |
| 4 | Br—[—CH$_2$]$_6$—Br | —[—CH$_2$—]$_4$— |
| 5 | Br—CH$_2$—CH$_2$—CH(CH$_3$)—CH$_2$—CH$_2$—Br | —CH$_2$—CH(CH$_3$)—CH$_2$— |
| 6 | Br—CH$_2$—C(CH$_3$)$_2$—CH$_2$—Br | —C(CH$_3$)$_2$— |
| 7 | Br—CH$_2$—CH=CH—CH$_2$—Br | —CH=CH— |
| 8 | Br—CH$_2$—(furan)—CH$_2$—Br | —(furan)— |
| 9 | Cl—CH$_2$—(biphenyl)—CH$_2$Cl | —(biphenyl)— |
| 10 | Br—CH$_2$—CH$_2$—O—CH$_2$—CH$_2$—Br | —CH$_2$—O—CH$_2$— |

EXAMPLE 11

A mixture consisting of 120 g of the compound of the formula ene is removed in vacuo, and the residue is subjected to fractional distillation under high vacuum to yield the product of the formula

[structure with N(C$_2$H$_5$)—CH$_2$—CH$_2$—N(C$_2$H$_5$) linking two m-tolyl groups]

Elementary analysis:
calculated: C 81.03, H 9.52, N 9.45;
found: C 81.22, H 9.54, N 9.34.

in the form of viscous oil: b.p. 0.4 mm Hg/158°-169°.

By using, in place of the above-given starting materials, equivalent amounts of the compounds 2-7 and 10 listed in column II of Table 1, with otherwise the same procedure, there are obtained the corresponding compounds of the formulae jected to fractional distillation under high vacuum, whereby the product of the formula

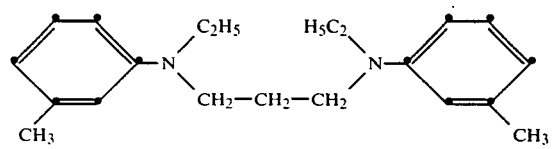

b.p. 0.1 mm Hg/73°,

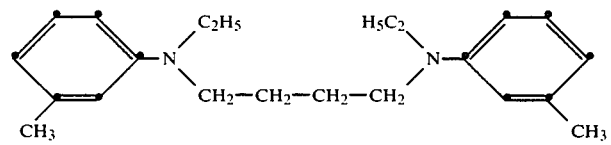

b.p. 0.1 mm Hg/105°,

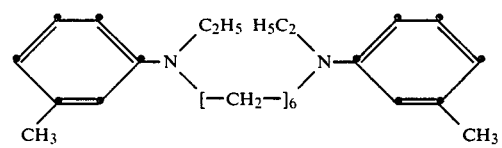

b.p. 0.1 mm Hg/165–167°
Elementary analysis:
calculated: C 81.76,
H 10.29, N 7.95,
found: C 81.79,
H 10.18, N 8.10.

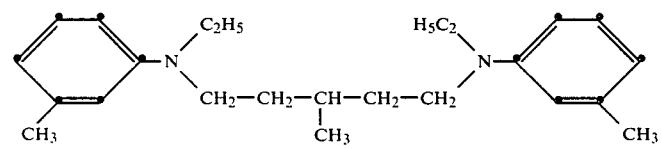

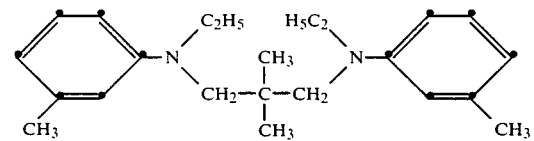

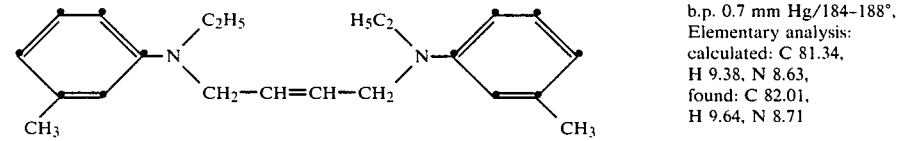

b.p. 0.7 mm Hg/184–188°,
Elementary analysis:
calculated: C 81.34,
H 9.38, N 8.63,
found: C 82.01,
H 9.64, N 8.71

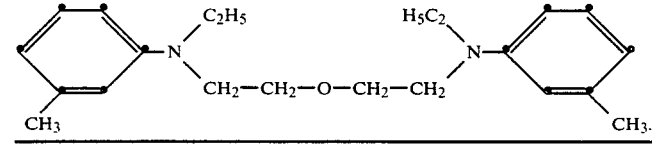

EXAMPLE 12

A mixture of 270 g of N-ethyl-m-toluidine, 94 g of 1,2-dibromoethane and 40 g of magnesium oxide is stirred for 12 hours at 100°–105° and subsequently for 2 hours at 123°–125°, whereupon the mixture is diluted with 300 ml of isopropanol and, after the addition of 10 g of a filtering auxiliary, clarified through a suction filter. The filter residue is washed with 200 ml of hot isopropanol; the filtrates are then combined, and the isopropanol is removed in vacuo. The residue is sub-

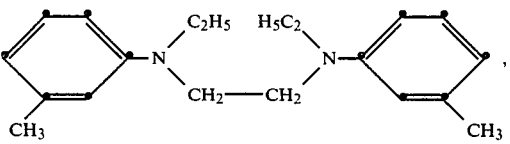

which is identical to that of Example 11, can be isolated as a viscous oil.

By using, in place of dibromoethane, equivalent amounts of the dihalogen compounds shown in column I of the following Table 2, the procedure otherwise being the same, there are obtained the compounds listed in column II.

TABLE 2

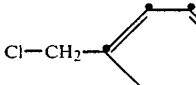

| No. | I Dihalogen compound | X |
|---|---|---|
| 13 | Br—CH₂—CH₂—CH₂—Br | —CH₂— |
| 14 | Br—CH₂—CH₂—CH₂—CH₂—Br | —CH₂—CH₂— |
| 15 | Br—[—CH₂—]₆—Br | —[—CH₂—]₄— |
| 16 | Br—CH₂—CH₂—CH(CH₃)—CH₂—CH₂—Br | —CH₂—CH(CH₃)—CH₂— |
| 17 | Br—CH₂—C(CH₃)₂—CH₂—Br | —C(CH₃)₂— |
| 18 | Cl—CH₂—CH=CH—CH₂—Cl | —CH=CH— |
| 19 |  | 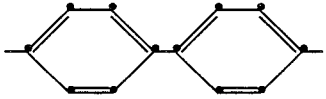 |
| 20 | Cl—CH₂—⌬—⌬—CH₂Cl | —⌬—⌬— |
| 21 | Cl—CH₂—CH₂—O—CH₂—CH₂—Cl | —CH₂—O—CH₂— |

EXAMPLE 22

A mixture of 120 g of the compound of the formula

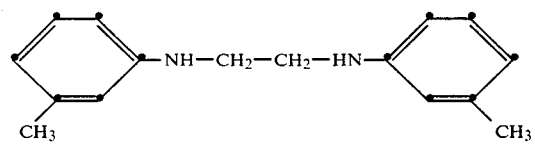

138 g of 2-bromoethanol and 40 g of magnesium oxide is stirred for 12 hours at 120°–122°, whereupon 300 ml of isopropanol and 10 g of a filtering auxiliary are added, and the mixture is clarified through a suction filter. The filter residue is washed with a total of 200 ml of hot isopropanol, and from the combined filtrates the isopropanol is distilled off in vacuo. The residue is subjected to fractional distillation under high vacuum, and the product of the formula

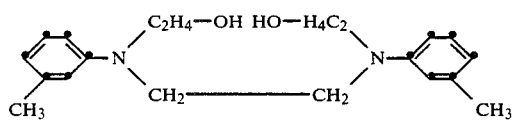

is separated in the form of viscous oil.

If there are used, instead of the above stated starting material, equivalent amounts of the compound of the formula

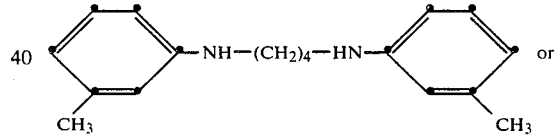 or

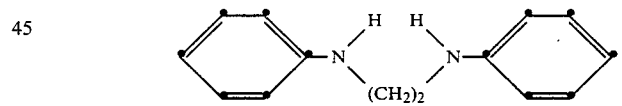

with otherwise the same procedure, there is obtained the product of the formula

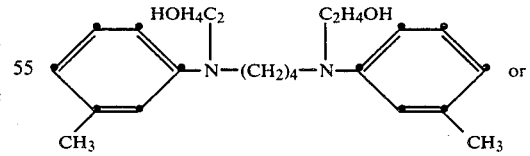 or

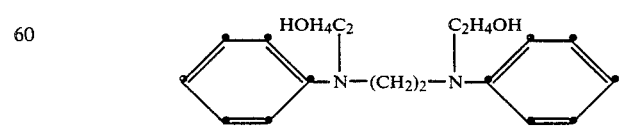

m.p. 68°.

By using, instead of bromoethanol, equivalent amounts of benzyl chloride, the procedure otherwise being the same, there are obtained the compounds of the formulae

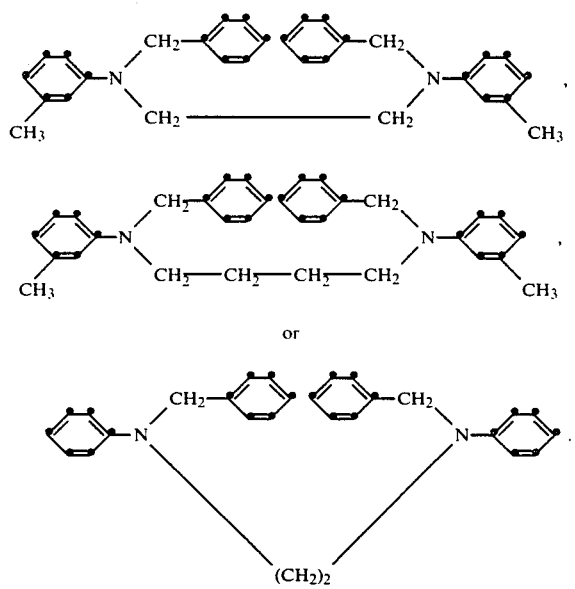

or

EXAMPLE 23

A mixture consisting of 120 g of the compound of the formula

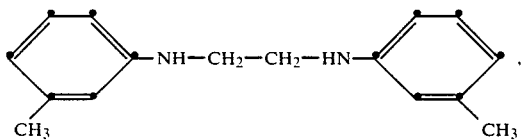

60 g of acrylonitrile, 4 g of copper(1) chloride and 150 ml of glacial acetic acid is stirred under reflux for 24 hours. The acetic acid is thereupon removed in vacuo, and the residue is treated with a 3% solution of ethylenediamine in water; the residue is afterwards treated firstly with water, then with 2% hydrochloric acid, and finally again with water until a neutral reaction is indicated. Drying in vacuo at 70° yields the product of the formula

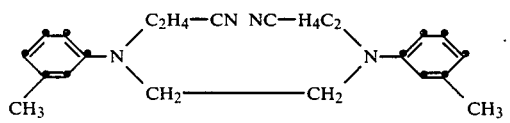

EXAMPLE 24

A mixture consisting of 120 g of the compound of the formula

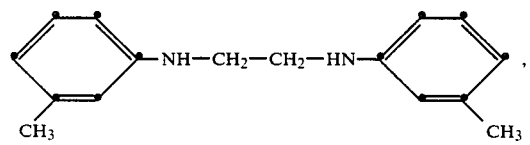

125 g of propanesultone-1,3, 40 g of magnesium oxide and 600 ml of ethylene glycol monoethyl ether is stirred for 12 hours at 110°–115°, whereupon the solvent is removed as completely as possible in vacuo. To the residue is added 1 liter of water and then hydrochloric acid is added in order to dissolve residues of magnesium salts; the pH value is subsequently adjusted to about 5 by the addition of potassium hydroxide solution, and the product of the formula

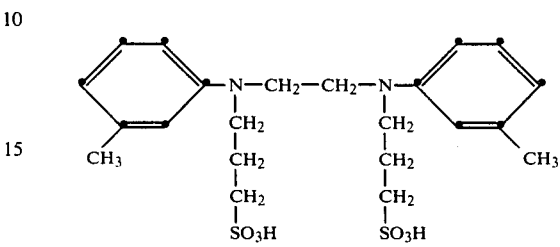

is precipitated as potassium salt, which dissolves in water to give a colourless solution.

EXAMPLE 25

44.8 g of the compound of the formula

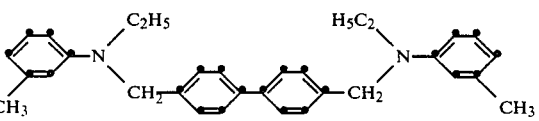

are introduced into a mixture of 23.5 g of 20% oleum and 53 g of 98% sulfuric acid at 15°, whereupon the mixture is cooled to 10°, and 42 g of 65% oleum are added at this temperature. The temperature is raised to 20°–22°, and the mixture is stirred for a further 2 hours at this temperature, and is then poured into a mixture of 180 g of ice and 75 ml of water. The solution obtained is heated to 80°, and about 170 g of calcium carbonate are added until the solution is neutral; it is then diluted with 350 ml of water; 50 g of a filtering auxiliary (diatomaceous earth) are added and the mixture is filtered through a suction filter, whereupon the filter residue is washed with hot water. Sodium carbonate is added to the brown solution at 80° until the pH value is 7–8, and the precipitated calcium carbonate is separated through a suction filter. The filtrate is evaporated in vacuo to dryness, and the residue is subsequently dried in a vacuum chamber at 70° to yield the product of the formula

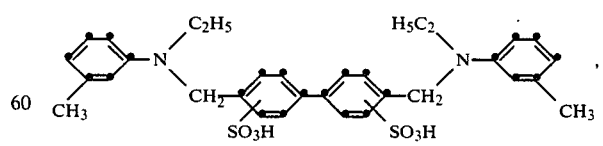

in the form of its sodium salt, as a light-beige coloured powder, which readily dissolves in water.

When there is used, instead of the above-mentioned starting material, an equivalent amount of the compound of the formula

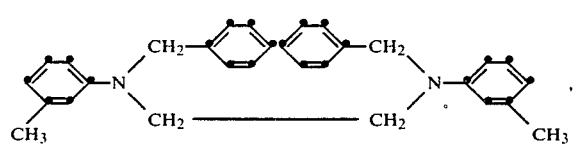

the procedure otherwise being the same, there is obtained the compound of the formula

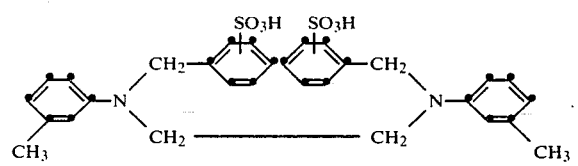

EXAMPLE 26

A mixture consisting of 190 g of the compound of the formula

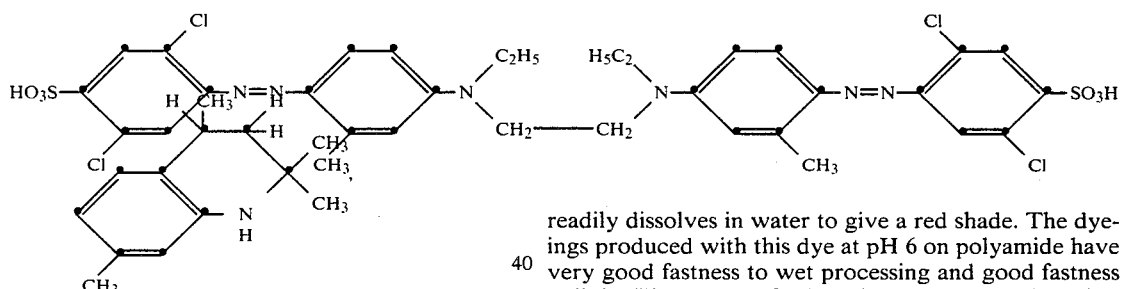

108 g of 1,4-dibromobutane and 40 g of magnesium oxide is stirred for 12 hours at 120°–125°, whereupon the mixture is diluted with 300 ml of toluene and, after the addition of 10 g of a filtering auxiliary, it is clarified through a suction filter. The filter residue is washed with hot toluene, the filtrates are combined, and the toluene is then distilled off in vacuo. The residue is subjected to fractional distillation under high vacuum to thus obtain the product of the formula

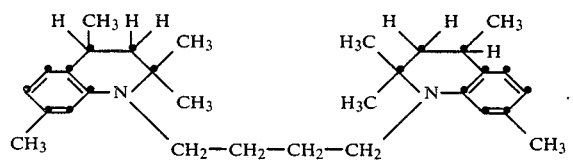

EXAMPLE 27

5.10 g of 2,5-dichloroaniline-4-sulfonic acid are dissolved in 60 ml of water to form a neutral solution; 5.25 ml of 4N nitrite solution are added, and the whole is poured, with thorough stirring, onto a mixture of 60 g of fine ice and 6 ml of 36% hydrochloric acid. After completed diazotisation, the nitrite excess is decomposed with sulfamic acid. The pH value of the diazo suspension is adjusted to 3 by the careful addition of solid sodium carbonate at 0°–2°. There is then added dropwise at 0°–2° a solution of 3 g of the compound of the formula

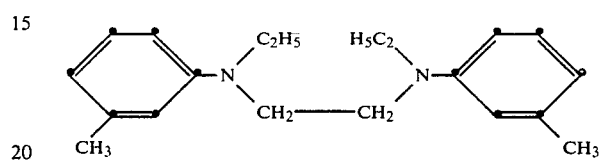

in 15 ml of acetic acid, the pH value being maintained at 3–4 by the addition of ammonium acetate. After completed coupling, the pH value is adjusted to 5.5 with sodium hydroxide solution, the temperature is raised to 55°, and 2 vol.% of sodium chloride is added, whereupon the dye precipitates after a short time as sodium salt. The resulting dye of the formula readily dissolves in water to give a red shade. The dyeings produced with this dye at pH 6 on polyamide have very good fastness to wet processing and good fastness to light. The degree of exhaustion at pH 6 and the build-up are excellent.

By using, in place of 2,5-dichloroaniline-4-sulfonic acid, equivalent amounts of the diazo components D—NH$_2$ listed in Table 3 under I, with otherwise the same procedure, there are obtained, after diazotisation and coupling thereof to the coupling component given in the above Example, the dyes of the formula

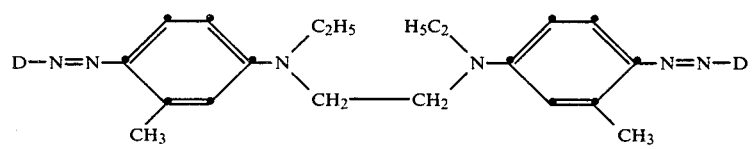

which likewise produce at pH 6 on polyamide dyeings having fastness to wet processing and to light.

TABLE 3

| No. | I<br>Diazo component (D)—NH$_2$ | II<br>Shade on polyamide |
|---|---|---|
| 28 | 　HO$_3$S—C$_2$H$_4$—NHO$_2$S-[ring with Cl, Cl, NH$_2$] | bluish-red |

TABLE 3-continued

| No. | Diazo component (D)—NH₂ | Shade on polyamide |
|---|---|---|
| 29 | HO₃S—O—C₂H₄—NHO₂S—[2,5-dichlorophenyl]—NH₂ | " |
| 30 | HO₃S—[phenyl]—NHO₂S—[2,5-dichlorophenyl]—NH₂ | " |
| 31 | [3-sulfophenyl]—NHO₂S—[2,5-dichlorophenyl]—NH₂ | " |
| 32 | [2-sulfophenyl]—NHO₂S—[2,5-dichlorophenyl]—NH₂ | " |
| 33 | HO₃S—C₂H₄—NHO₂S—[3-chlorophenyl]—NH₂ | red |
| 34 | HO₃S—O—C₂H₄—N(phthalimido with NH₂) | " |
| 35 | HO₃S—O—C₂H₄—N(phthalimido with NH₂) | " |
| 36 | (SO₃H, H₃C phenyl)—N(phthalimido with NH₂) | " |
| 37 | (SO₃H, H₃C phenyl)—N(phthalimido with NH₂) | " |
| 38 | (SO₃H furyl)—CH₂—N(phthalimido with NH₂) | " |
| 39 | (SO₃H furyl)—CH₂—N(phthalimido with NH₂) | " |
| 40 | HO₃S—[benzothiazol-2-yl]—NH₂ | bluish-red |

EXAMPLE 40a

When there is used as coupling component the compound of the formula

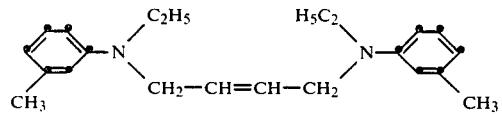

and the diazo component given in Example 34, with otherwise the same procedure, there is obtained the dye of the formula

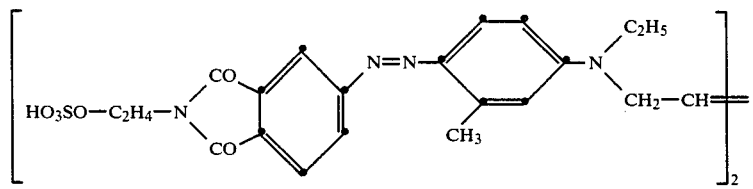

which dyes polyamide at pH 6 in a red shade which is fast to wet processing and to light.

By using as diazo component 2,5-dichloroaniline-4-sulfonic acid and as coupling component any one of those listed in the following Table 4, the procedure otherwise being the same, there are obtained dyes of the formula

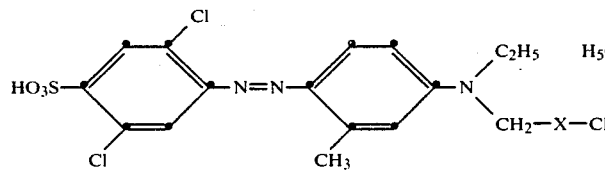
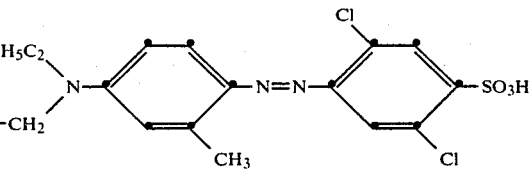

which produce on polyamide at pH 6 dyeings which are fast to wet processing and to light.

TABLE 4

| No. | CH₃ | X = | CH₃ | Shade on polyamide |
|---|---|---|---|---|
| 41 | | —CH₂— | | red |
| 42 | | —CH₂—CH₂— | | " |
| 43 | | $\begin{array}{c}CH_3\\|\\-C-\\|\\CH_2\end{array}$ | | " |
| 44 | | —CH₂—CH—CH₂—<br>  \|<br>  CH₃ | | " |
| 45 | | —CH₂—CH₂—CH₂—CH₂— | | " |
| 46 | | —CH=CH— | | " |
| 47 | | —CH₂—O—CH₂— | | " |
| 48 | | (furan) | | " |
| 49 | | (biphenyl) | | " |

By using as coupling component an equivalent amount of the compound of the formula

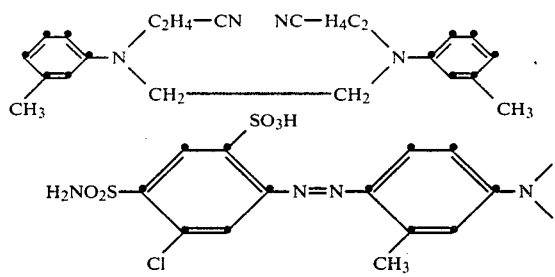

with otherwise the same procedure, there is obtained the dye of the formula

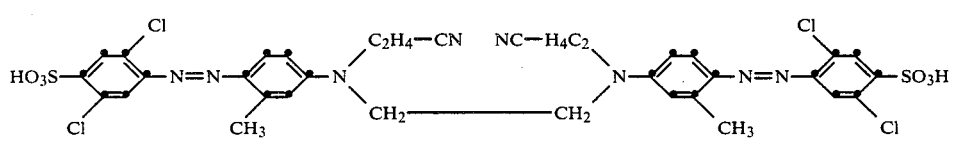

which produces at pH 6 on polyamide scarlet dyes having fastness to wet processing and to light.

EXAMPLE 50

10.3 g of 5-chloroaniline-2,4-disulfonamide are dissolved at 50° in 40 ml of sulfolane; the solution is diluted with 50 ml of hot water, and 10 ml of 36% hydrochloric acid are then added. After cooling to 2°, the mixture is diazotised with 20 ml of 4N nitrite; it is stirred for a further 30 minutes at 0°–2°, and a nitrite excess is decomposed with sulfamic acid.

5 g of the compound of the formula

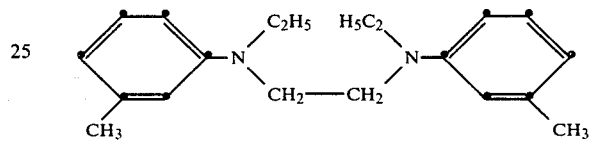

are then dissolved at 50° in 50 ml of water with the addition of 4 ml of 36% hydrochloric acid, and this solution is added dropwise to the diazo solution, the temperature being maintained at 8°. The mixture is subsequently stirred for 17 hours at room temperature, the temperature is then raised to 50°, and the dye which has precipitated is filtered off and washed with 200 ml of water. The filter material is suspended in 200 ml of water, the temperature is raised to 45°, and the pH value of the mixture is adjusted with conc. sodium hydroxide solution to 7.4. 2.5 vol.% of sodium chloride and 70 ml of 95% alcohol are added, whereupon the dye which has precipitated is filtered off, washed with 150 ml of 5% sodium chloride solution, and subsequently dried at 70° in vacuo.

The resulting dye of the formula

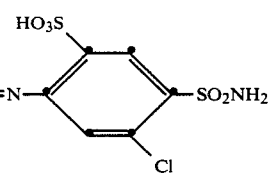

dissolves in water to give a red shade. The red dyeings produced using this dye at pH 6 on polyamide have good fastness to light and to wet processing.

By using, in place of the above-stated coupling component, equivalent amounts of the coupling components shown in the following Table 5, with otherwise the same procedure, there are obtained the dyes of the formula

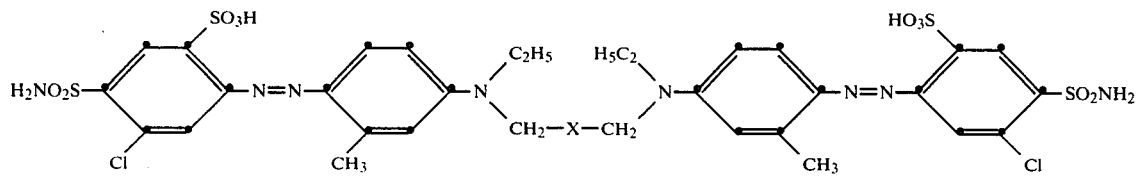

having similar properties.

TABLE 5

| No. | Coupling component X = | Shade on polyamide |
|---|---|---|
| 51 | —CH₂— | red |
| 52 | —CH₂—CH₂— | " |
| 53 | $\begin{array}{c}CH_3\\|\\-C-\\|\\CH_3\end{array}$ | " |
| 54 | —CH₂—CH—CH₂—<br>     \|<br>     CH₃ | " |
| 55 | —CH₂—CH₂—CH₂—CH₂— | " |
| 56 | —CH=CH— | " |
| 57 | —CH₂—O—CH₂— | " |
| 58 | (cyclohexyl-like fragment) | " |

TABLE 5-continued

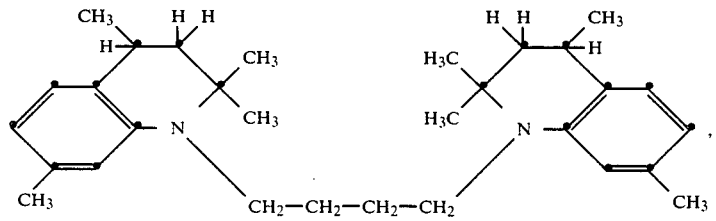

| No. | Coupling component X = | Shade on polyamide |
|---|---|---|
| 59 | (biphenyl) | " |

If there are used, in place of the initially stated coupling component, equivalent amounts of the coupling component of the formula with otherwise the same procedure, there is obtained, with use of 5-chloroaniline-2,4-disulfonamide as the diazo component, the dye of the formula which produces at pH 6 on polyamide bluish-red dyeings having fastness to wet processing and to light.

If there are used in the last Example, instead of 2,4-disulfonamido-5-chloro-aniline as the diazo component, an equivalent amount of 2,5-dichloroaniline-4-sulfonic acid, the procedure otherwise being the same, there is obtained the dye of the formula

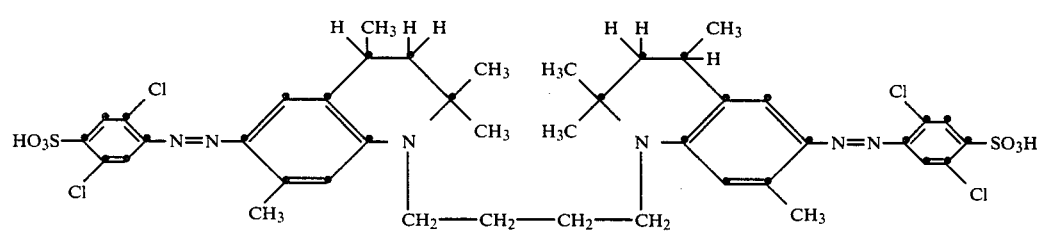

which dyes polyamide from an aqueous bath at pH 6 in bluish-red shades having fastness to wet processing and to light.

EXAMPLE 60

2/100 ml of the diazo compound of 2,5-dichloroaniline-4-sulfaethylamine as an aqueous suspension, the pH value of which has been adjusted to 3 with sodium carbonate, is added at 0°–5° to a solution of 1/100 mol of the compound of the formula

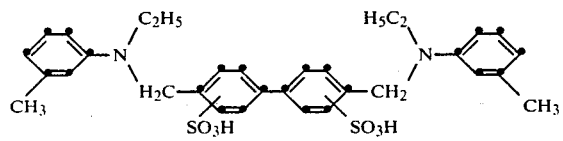

in the form of its sodium salt dissolved in 100 ml of water. Coupling is performed at 0°–5°, the pH value being kept at 3–4; the pH value is subsequently adjusted to 7 with sodium hydroxide solution, and the dye is isolated in the customary manner by salting out with sodium chloride. The resulting dye of the formula

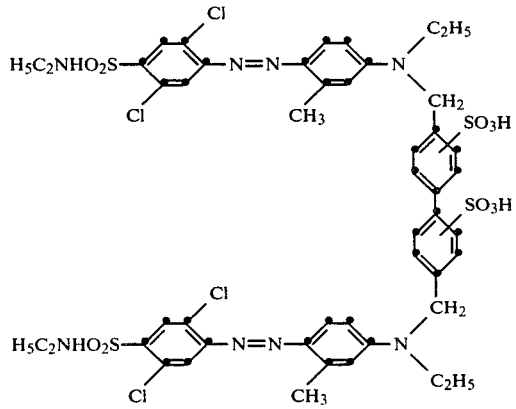

dyes polyamide at pH 6 in bluish-red shades having fastness to wet processing and to light.

By using, instead of the above-given coupling component, equivalent amounts of the coupling component of the formula

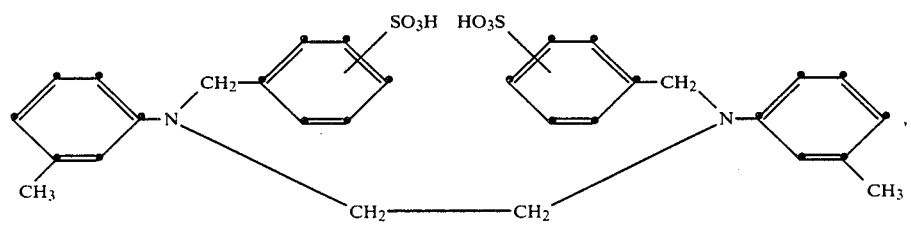

the procedure being otherwise the same, there is obtained the dye of the formula

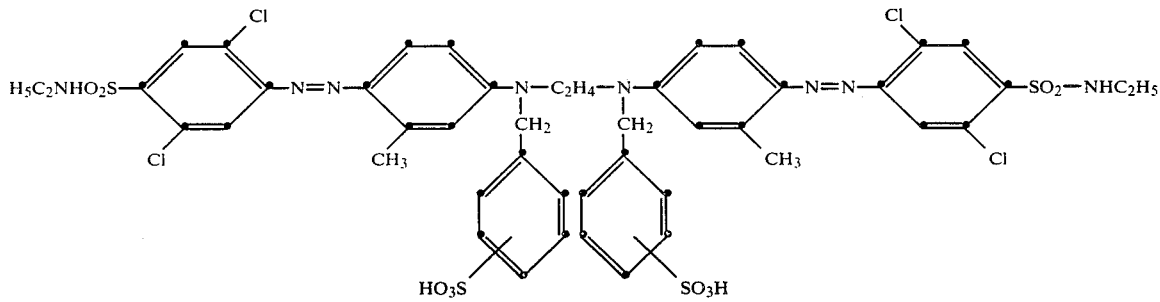

which has similar properties.

With use of an equivalent amount of the coupling component of the formula

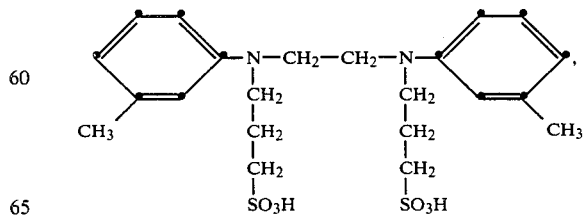

the procedure otherwise being the same, there is obtained the dye of the formula

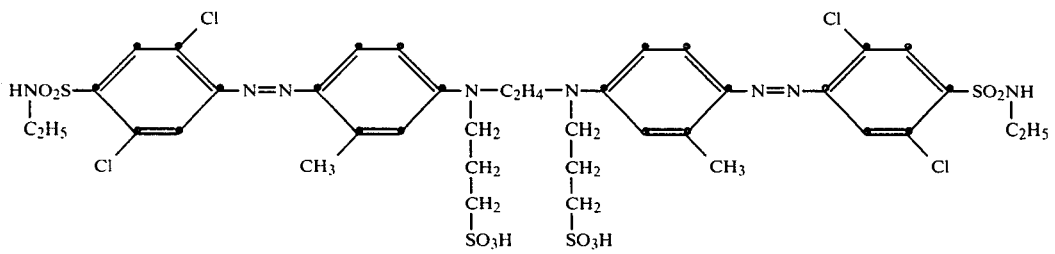

which dyes polyamide at pH 6 from an aqueous bath in bluish-red shades fast to wet processing and to light.

By using, instead of 2,5-dichloroaniline-4-sulfethylamide, an equivalent amount of the diazonium compound of 2-amino-benzothiazole, with otherwise the same procedure, there are obtained the corresponding dyes of the formula

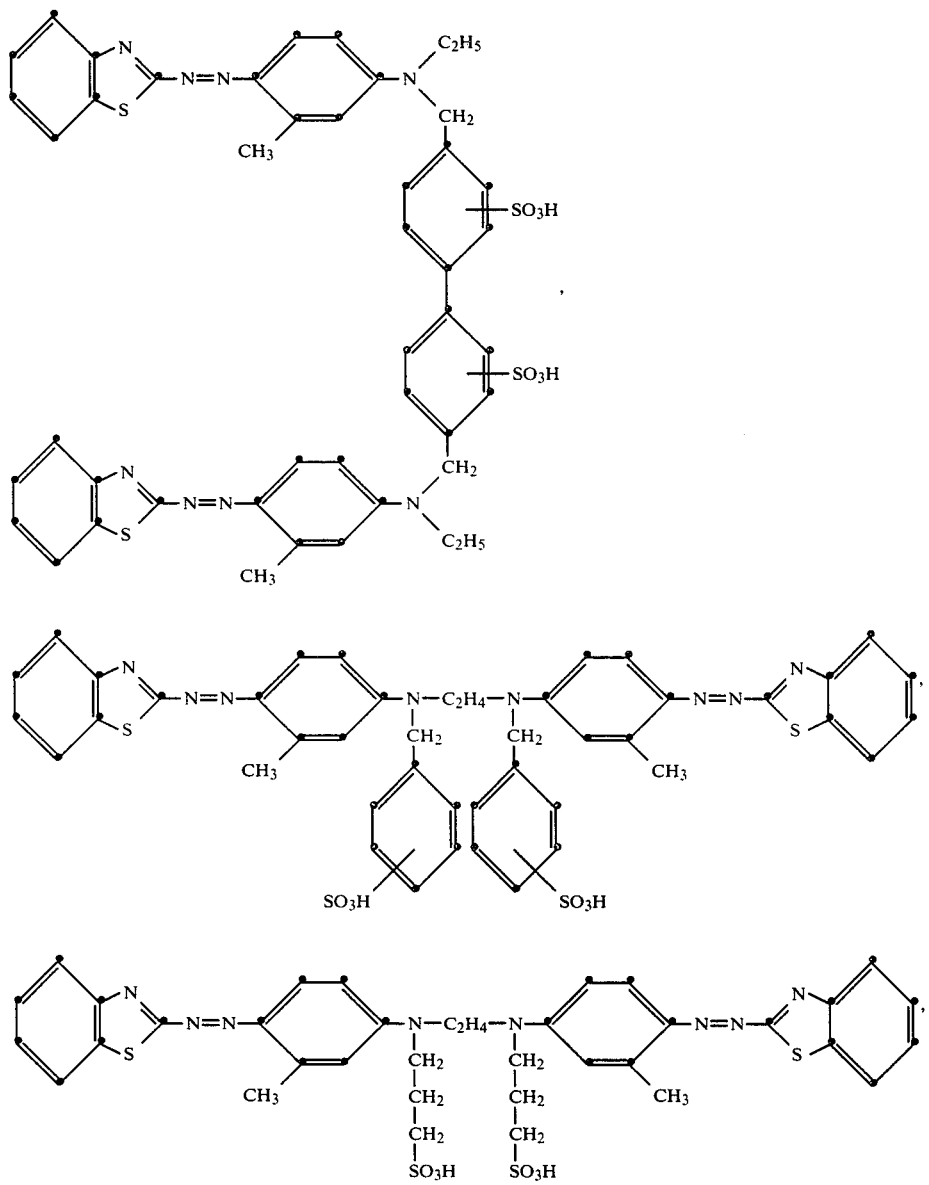

which dye polyamide at pH 6 in fast bluish-red shades.

EXAMPLE 61

1/100 mol of the compound of the formula

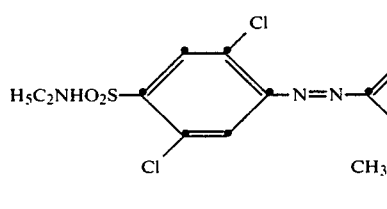

obtained by diazotisation of 2,5-dichloroaniline-4-sulfethylamine and coupling to the compound of the formula

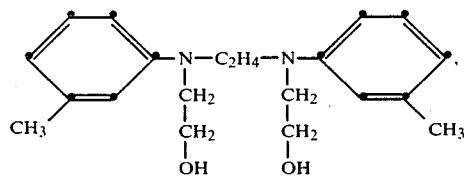

is dissolved in 40 ml of pyridine; 4 g of chlorosulfonic acid are then added, and the mixture is stirred for 8 hours at a temperature of 68°–70°. After cooling of the mixture, a small amount of water is added, 6 g of sodium bicarbonate are subsequently added, and the pyridine is distilled off in vacuo at 40°–50° bath temperature. To the residue are added 30 ml of water; the pH value is adjusted to 7, and the dye is precipitated at 60° with sodium chloride; the dye is in the form of oil, which is isolated and subsequently freed in vacuo at 70° from adhering water. The resulting dye of the formula

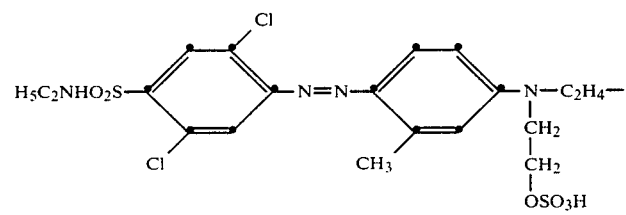

readily dissolves in water to give a red shade. The red dyeings produced with the use of this dye at pH 6 on polyamide have good fastness to wet processing and to light.

If there is used, in place of the aforementioned disazo dye, the same dye but one containing no methyl group in the benzene nuclei of the coupling component, the procedure otherwise being the same, there is obtained by reaction with chlorosulfonic acid the dye of the formula

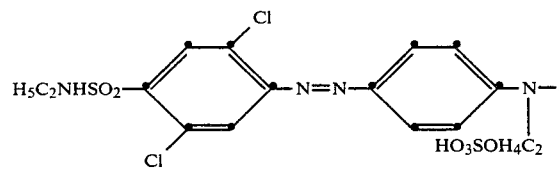

which dyes polyamide at pH 6 in a red shade which is fast to light and to wet processing.

EXAMPLE 62

A mixture consisting of 55 g of N-ethyl-N-chloroethylaniline, 162 g of N-ethyl-m-toluidine and 6 g of magnesium oxide is stirred for 2 hours at a temperature of 148°–150°, in the course of which formed water is distilled off at reduced pressure into a receiver. The mixture is allowed to cool, the magnesium salts are filtered off, and the filtrate is subjected to distillation under high vacuum, whereupon the formed product of the formula

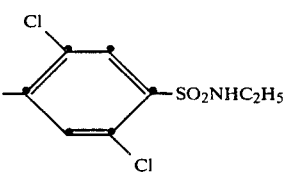

b.p. 0.1 mm Hg/138–148° is obtained as viscous oil.

If there is used, instead of N-ethyl-m-toluidine, an equivalent amount of N-ethyl-aniline, the procedure otherwise being the same, there is obtained the product of the formula

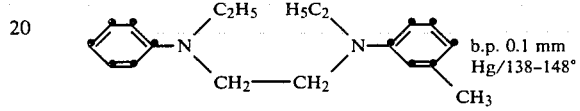

m.p. 75–78.

EXAMPLES 63–72

If the diazo components D—NH$_2$ listed in the following Table 6 are coupled (at the position →) in the customary manner in the acid pH range to the coupling component of the formula

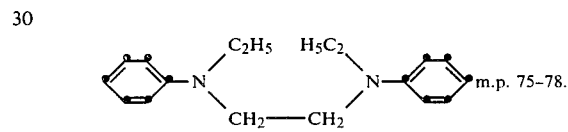

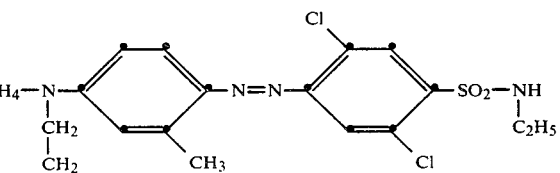

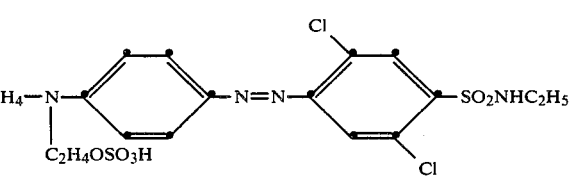

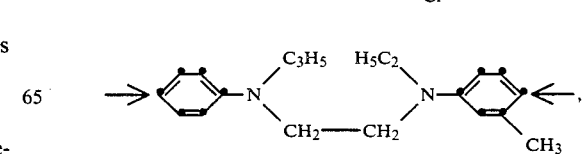

there are obtained disazo dyes which dye polyamide at pH 6 with a very good degree of exhaustion. The dyeings obtained have a high fastness to wet processing.

TABLE 6

| No. | Diazo component D—NH$_2$ | Shade on polyamide |
|---|---|---|
| 63 | HO$_3$S—CH$_2$—CH$_2$—NHO$_2$S—[2,5-dichloro-4-aminophenyl] | red |
| 64 | HO$_3$S—CH$_2$—CH$_2$—N(CH$_3$)—O$_2$S—[2,5-dichloro-4-aminophenyl] | " |
| 65 | HO$_3$S—O—CH$_2$—CH$_2$—NHO$_2$S—[2,5-dichloro-4-aminophenyl] | " |
| 66 | HO$_3$S—O—CH$_2$—CH$_2$—N(CH$_3$)—O$_2$S—[2,5-dichloro-4-aminophenyl] | " |
| 67 | HO$_3$S—O—CH$_2$—CH$_2$—N(C$_2$H$_5$)—O$_2$S—[2,5-dichloro-4-aminophenyl] | " |
| 68 | HO$_3$S—[2,5-dichloro-4-aminophenyl] | " |
| 69 | H$_2$NO$_2$S—[2-SO$_3$H, 4-Cl, 5-NH$_2$ phenyl] | " |
| 70 | [2-SO$_3$H-aminophenyl] | yellow |
| 70a | HO$_3$S—[Cl-aminophenyl] | " |
| 71 | [SO$_3$H, NH$_2$, NHOC—CHBr—CH$_2$—Br phenyl] | " |
| 72 | H$_2$C(Br)—HC(Br)—COHN—[SO$_3$H, NH$_2$ phenyl] | reddish-yellow |

EXAMPLES 73–84

By employing the coupling component of the formula

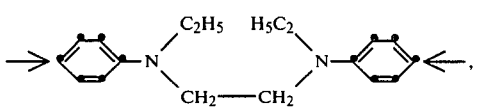

the procedure otherwise being analogous to that in Examples 63–72, there are obtained, with use of the diazo components given in Table 7, disazo dyes which have similar properties.

TABLE 7

| No. | Diazo components | Shade on polyamide |
|---|---|---|
| 73 | HO$_3$S—CH$_2$—CH$_2$—NHO$_2$S—[2,5-dichloro-4-aminophenyl] | red |
| 74 | HO$_3$S—CH$_2$—CH$_2$—N(CH$_3$)—O$_2$S—[2,5-dichloro-4-aminophenyl] | " |
| 75 | HO$_3$S—O—CH$_2$—CH$_2$—NHO$_2$S—[2,5-dichloro-4-aminophenyl] | " |
| 76 | HO$_3$S—O—CH$_2$—CH$_2$—N(CH$_3$)—O$_2$S—[2,5-dichloro-4-aminophenyl] | " |
| 77 | HO$_3$S—O—CH$_2$—CH$_2$—N(C$_2$H$_5$)—O$_2$S—[2,5-dichloro-4-aminophenyl] | " |
| 78 | HO$_3$S—[2,5-dichloro-4-aminophenyl] | yellowish-red |
| 79 | H$_2$NO$_2$S—[2-SO$_3$H, 4-Cl, 5-NH$_2$ phenyl] | red |
| 80 | [2-SO$_3$H-aminophenyl] | yellow |
| 81 | HO$_3$S—[aminophenyl] | " |

TABLE 7-continued

| No. | Diazo components | Shade on polyamide |
|---|---|---|
| 82 | ![Cl, NH2, SO3H on benzene ring] | " |
| 83 | ![SO3H, NH2, NHOC—CHBr—CH2Br on benzene ring] | " |
| 84 | ![H2C(Br)—HC(Br)—COHN—, NH2, SO3H on benzene ring] | reddish-yellow |

EXAMPLE 85

2/100 mol of the diazonium compound of 2,5-dichloroaniline-4-sulfonic acid is coupled, at a temperature of 0°–2° and a pH value of 3–4, with 1/100 mol of the compound of the formula

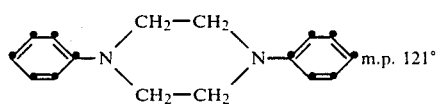
m.p. 121°

(produced according to J. Amer. Chem. Soc. 40, 1429 (1918) or Ber. 22, 1778), and the formed dye of the formula

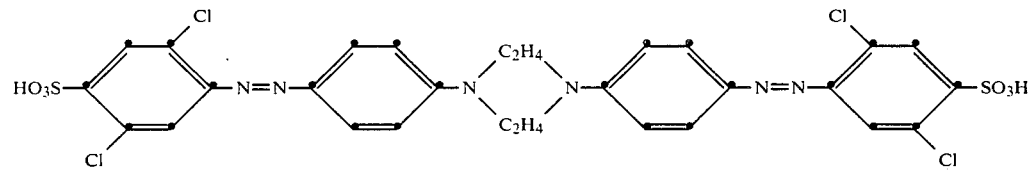

is subsequently isolated as sodium salt, which forms a red powder which dissolves in water to give a red shade.

Dyed on polyamide at pH 6, the dye has a very high degree of exhaustion. The red dyeings obtained have good fastness to wet processing and to light.

When there are used, in place of 2,5-dichloroaniline-4-sulfonic acid, equivalent amounts of the diazo components, D—NH2, given in the following Table 8, there are obtained disazo dyes of the formula

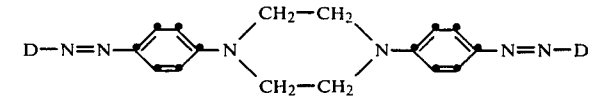

which produce on polyamide at pH 6 dyeings likewise having very good wet fastness properties.

TABLE 8

| No. | Diazo components D—NH2 | Shade on polyamide |
|---|---|---|
| 86 | HO3S—C2H4—NHO2S—[Cl,Cl benzene]—NH2 | red |
| 87 | HO3S—C2H4—N(CH3)—O2S—[Cl,Cl benzene]—NH2 | " |
| 88 | HO3S—O—C2H4—NHO2S—[Cl,Cl benzene]—NH2 | " |
| 89 | HO3S—O—C2H4—N(CH3)—O2S—[Cl,Cl benzene]—NH2 | " |

EXAMPLE 89a

If the coupling component of the formula

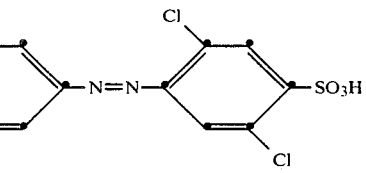

is used, and to this are coupled 2 equivalents of diazotised 2,5-dichloroaniline-4-sulfonic acid, there is obtained the dye of the formula

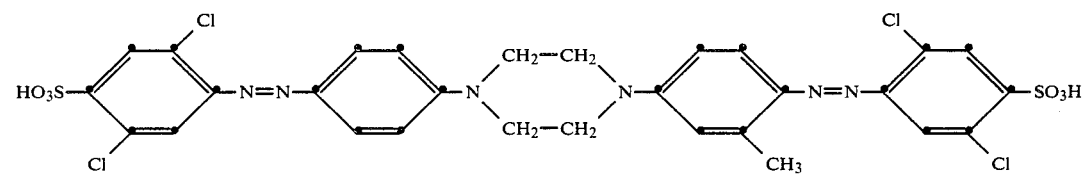

which dyes polyamide at pH 6 in a red shade having very good fastness to wet processing.

When there are used, in place of the coupling component given above, equivalent amounts of the coupling component of the formula

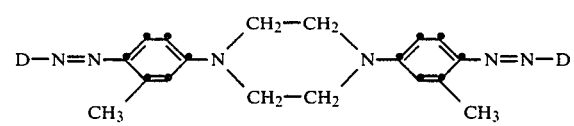

b.p. 0.2 mm Hg/175-184°

Elementary analysis:

| calculated: | C 81.16, | H 8.33, | N 16.52 |
|---|---|---|---|
| found: | C 80.83, | H 8.63, | N 10.89 |

(prepared according to J. Amer. Chem. Soc. 40, 1429 (1918) or Ber. 22, 1778 with use of m-toluidine instead of aniline), there are obtained, with the use of the diazo components, D—NH₂, given in the following Table 9, disazo dyes of the formula D—N=N—[ring]—N(CH₂—CH₂)(CH₂—CH₂)N—[ring]—N=N—D
         CH₃                                    CH₃ which produce on polyamide at pH 6 likewise dyeings having a high degree of exhaustion and good fastness to wet processing.

TABLE 9

| No. | Diazo components D—NH₂ | Shade on polyamide |
|---|---|---|
| 90 | HO₃S—[ring(Cl,Cl)]—NH₂ | red |
| 91 | HO₃S—C₂H₄—NHO₂S—[ring(Cl,Cl)]—NH₂ | " |
| 92 | HO₃S—C₂H₄—N(CH₃)—O₂S—[ring(Cl,Cl)]—NH₂ | " |

TABLE 9-continued

| No. | Diazo components D—NH₂ | Shade on polyamide |
|---|---|---|
| 93 | HO₃S—O—C₂H₄—NHO₂S—[ring(Cl,Cl)]—NH₂ | " |
| 94 | HO₃S—O—C₂H₄—N(CH₃)—O₂S—[ring(Cl,Cl)]—NH₂ | " |

EXAMPLE 95

(A) 1. Diazotisation 1.73 g of orthanilic acid are dissolved in 25 ml of water with sodium hydroxide solution at pH 7, and 2.5 ml of 4N sodium nitrite are added. The solution is added dropwise to a mixture of 25 g of ice and 2.5 ml of concentrated hydrochloric acid. The diazo solution obtained is subsequently stirred, and any excess of nitrite present is decomposed with sulfamic acid.

(B) Coupling to the monoazo dye 2.82 g of the reaction product of N-ethyl-m-toluidine with N-ethyl-N-(2-chloroethyl)-aniline are dissolved in 25 ml of water with the addition of 3 ml of concentrated hydrochloric acid, and this solution is added dropwise to the diazo solution (A) produced above. The mixture is stirred cold for some time, and a constant pH value of 4 is then established with 4N sodium acetate. The monoazo dye which has precipitated is filtered off and washed with water.

(C) 2. Diazotisation 3.27 g of 2-amino-4'-methyl-diphenylsulfone-4-sulfonic acid are diazotised in the same manner as orthanilic acid under (A).

(D) Coupling to the disazo dye

The paste of the monoazo dye obtained under (B) is dissolved in 100 ml of water with sodium hydroxide solution at pH 7. The diazo suspension (C) is added in portions. To the reaction mixture are added 5 ml of pyridine, and stirring is continued overnight at room temperature. The dye is isolated by adjustment of the pH value to about 0.5 with conc. hydrochloric acid and filtered off; the paste is then taken into solution in 100 ml of water with sodium hydroxide solution at pH 7, and subsequently evaporated to dryness.

There are obtained 6.26 g of a scarlet dye powder of the formula

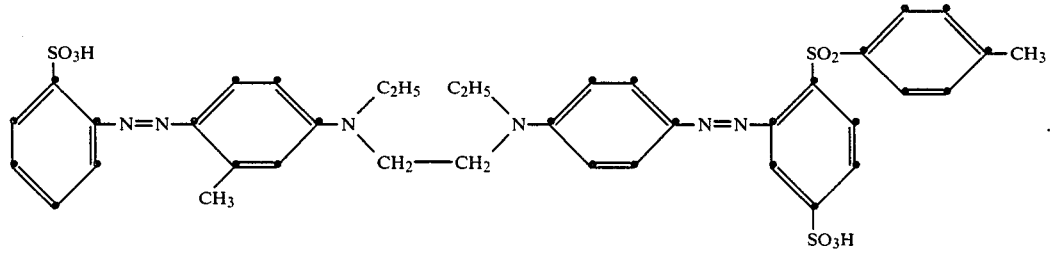

The dye has an excellent build-up capacity on polyamide and has good general fastness properties.

EXAMPLE 96

(A) 1. Diazotisation 1.73 g of orthanilic acid are diazotised as under Example 95(A).

(B) Coupling to the monoazo dye 2.68 g of N,N'-diethyl-N,N'-diphenyl-diaminoethane are dissolved in 30 ml of water with the addition of 3 ml of concentrated hydrochloric acid, and the solution is added to the diazo solution produced above. Stirring is maintained for 1 day at 40°–45°, and the monoazo dye thus obtained is then filtered off.

(C) 2. Diazotisation 3.27 g of 2-amino-4'-methyl-diphenylsulfone-4-sulfonic acid are diazotised in the same manner as orthanilic acid in Example 95(A).

(D) Coupling to the disazo dye

The paste of the monoazo dye obtained under (B) is dissolved in 100 ml of water with sodium hydroxide solution at pH 9, and 10 ml of 4N sodium acetate solution are added. After the addition of the disazo suspension (C), stirring is continued for a time, and the pH value is then brought to 7 with sodium hydroxide solution. To the solution which has been clarified by filtration are added 15 g of potassium chloride; and the product which precipitates is filtered off and dried. The yield is 4.95 g of a reddish-orange dye powder of the formula

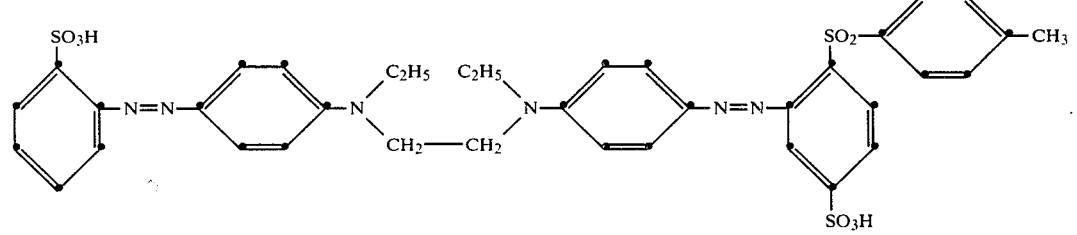

EXAMPLE 97

A dye bath is prepared from 4000 parts of water, 4 parts of ammonium acetate, 2 parts of the dye according to Example 27 and an amount of acetic acid to bring the pH value of the bath to 6. 100 parts of a synthetic polyamide tricot are introduced into the dye bath obtained; the bath is then heated within half an hour to boiling and the material is dyed for 45 minutes at 100°. A red dyeing have good fastness to wet processing is obtained.

EXAMPLE 98

100 parts of wool knitting yarn are introduced at 50° into a dye bath which contains, to 4000 parts of water, 2 parts of the dye of Example 27, 4 parts of ammonium sulfate and 2 parts of a levelling auxiliary. The liquor is brought to boiling in the course of 45 minutes, and is held for a further 45 minutes at boiling temperature. The dyed material is then removed, thoroughly rinsed with cold water and dried. A red wool dyeing having good fastness properties is obtained.

EXAMPLE 99

2 g of the dye according to Example 70a are dissolved in 100 ml of hot water; the liquor is briefly boiled up and is then padded directly in a padding machine, with a liquor absorption of 70–80%, onto 10 g of mercerized bleached cotton satin. The cotton satin impregnated with dye is subsequently dried in a drying chamber at 70°. To fix the dye, 200 ml of water containing 6 g of calc. sodium sulfate are heated to 95°, and in the aqueous sodium sulfate solution at 95° the dried cotton satin impregnated with dye is treated for 30 minutes, with the temperature being maintained at 95° and the fabric being kept in continual motion. The dyeing is subsequently rinsed in a standing bath with hot and cold water and is then ironed at 190°. A yellow cotton dyeing having good fastness properties is thus obtained.

What is claimed is:

1. A disazo compound of the formula

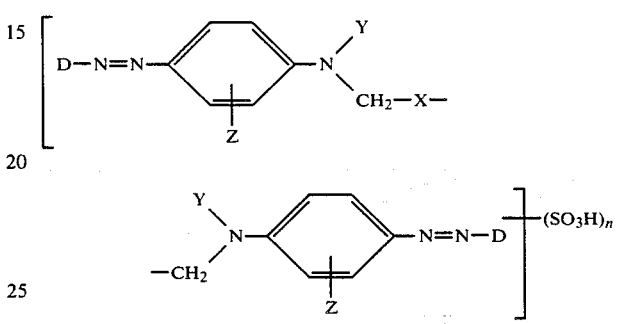

wherein each D independently of the other is

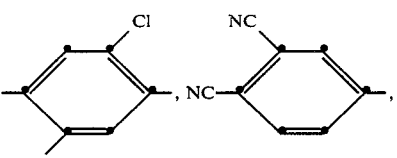

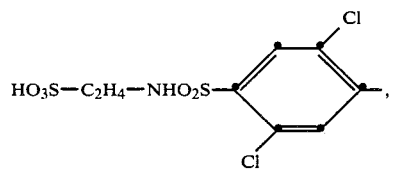

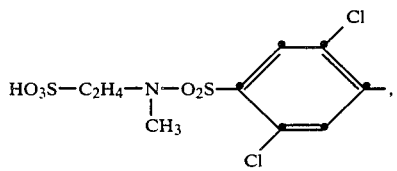

-continued

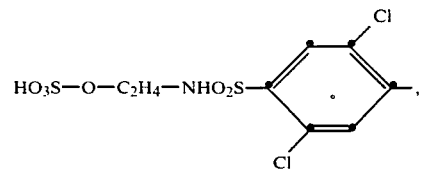

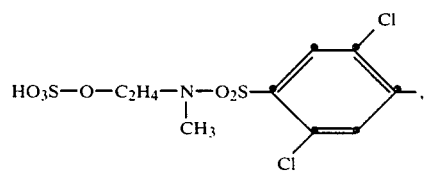

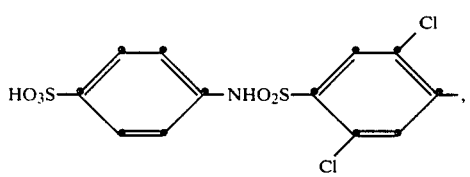

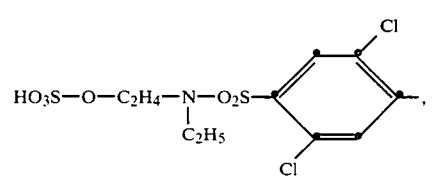

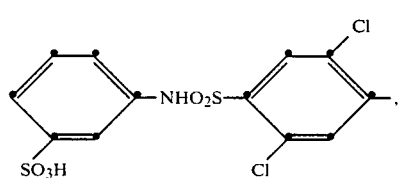

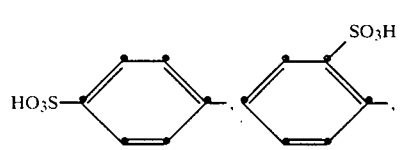

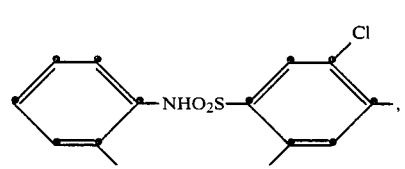

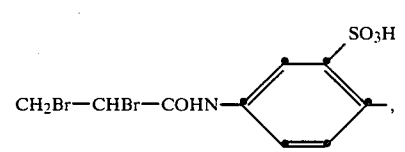

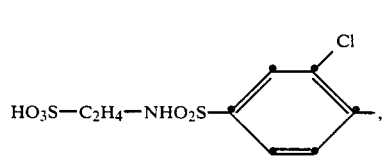

-continued

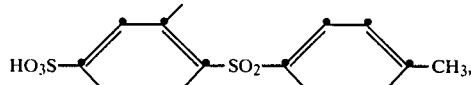

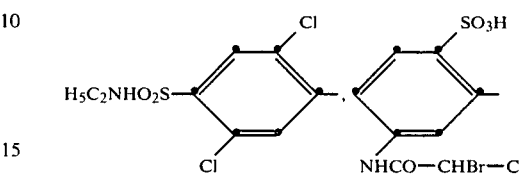

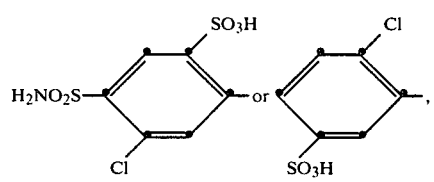

each Z independently of the other is hydrogen or a $C_{1-4}$-alkyl group or an acylamino group, Y is hydrogen or an unsubstituted or substituted $C_{1-6}$-alkyl group, X is a direct bond, $C_{1-6}$-alkylene, —CH=CH—, —CH$_2$—O—CH$_2$—,

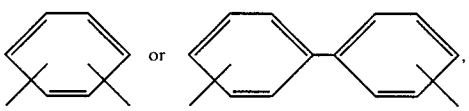

and n is a number from 2 to 6, and the substituent Y, in the case of an unsubstituted or substituted $C_{1-6}$-alkyl group, can be bonded to the o-position relative to the N atom of the phenylene group to form a six-membered ring, or both Y substituents can be linked together to form a $C_{1-6}$-alkylene bridge.

2. A disazo compound according to claim 1, wherein the two diazo components D are identical.

3. A disazo compound according to claim 1, wherein the two substituents Z are identical.

4. A disazo compound of claim 1, wherein n is 2.

5. A disazo compound according to claim 1, wherein the substituent Z is a $C_1$-$C_4$-alkyl group.

6. A disazo compound according to claim 5, wherein the substituent Z is the —CH$_3$ group.

7. A disazo compound according to claim 1, wherein X is the direct bond.

8. A disazo compound according to claim 1, wherein Y is an unsubstituted alkyl group.

9. A disazo compound according to claim 8, wherein Y is the —C$_2$H$_5$ group.

10. A disazo compound according to claim 4 of the formula

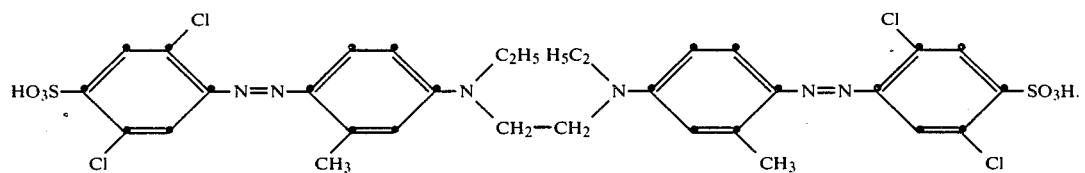
11. A disazo compound according to claim 4 of the formula
12. A disazo compound according to claim 4 of the formula
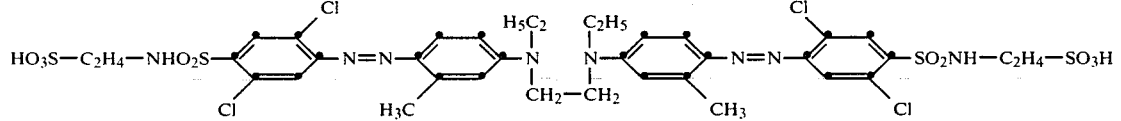
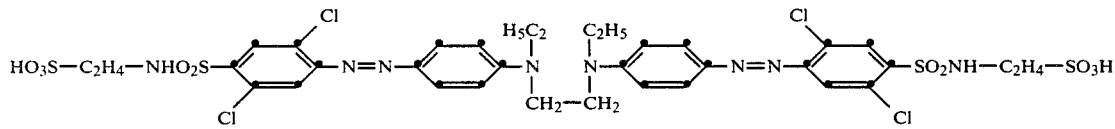
13. A disazo compound according to claim 4 of the formula
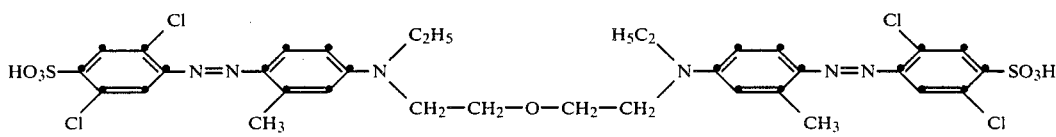
* * * * *